United States Patent Office 3,795,639
Patented Mar. 5, 1974

3,795,639
POLYESTER POLYCONDENSATION CATALYZED BY ANTIMONY AND GERMANIUM COMPOUNDS AND PHOSPHORIC ESTERS
Kazuya Chimura, Kazuo Ito, Shunichi Takashima, Mizuo Shindo, and Yoshihiro Shimoshinbara, Otake, Japan, assignors to Mitsubishi Rayon Company Limited, Chuoku, Tokyo, Japan
No Drawing. Filed May 10, 1971, Ser. No. 141,955
Claims priority, application Japan, May 26, 1970, 45/44,983
Int. Cl. C08g 17/015
U.S. Cl. 260—75 R                10 Claims

ABSTRACT OF THE DISCLOSURE

A process for preparing a linear polyester wherein polycondensation of glycol terephthalate is performed in the presence of (1) antimony compound, (2) germanium compound and (3) phosphoric ester. A used amount of the Sb compound is such that mole number of Sb atom contained therein is no less than 0.035% based on one mole of the recurring unit of the polyester. A used amount of the Ge compound is such that mole number of Ge atom contained therein is no more than 0.02% based on one mole of the recurring unit of the polyester and an atomic ratio of Ge/Sb is no more than 0.5. The polyester is characterized as containing reduced amounts of diethylene glycol and metallic antimony and exhibiting excellent whiteness and transparency.

---

The present invention relates to a process for preparing colorless linear polyesters and copolyesters by using an antimony-containing catalytic compound. More particularly, it relates to a process for preparing linear polyesters and copolyesters having improved whiteness and transparency, i.e. in which darkening or grayish color formation inevitably caused by using only conventional catalytic antimony compounds are obviated, and containing an extremely reduced amount of diethylene glycol, with an increased productivity by using, in addition to a catalytic antimony compound and phosphoric ester, a small amount of germanium compound.

Linear polyethylene terephthalate and copolyesters containing an ethylene terephthalate chain as a main component are particularly useful for textile fibers, film or molded articles. These polyesters are normally prepared through two reaction stages, that is, the first stage wherein, for example, dialkyl terephthalate is subjected to esterinterchange with ethylene glycol or terephthalic acid is directly esterified with ethylene glycol to be converted into bis-$\beta$-hydroxyethyl terephthalate of a low molecular weight polymer thereof and the second stage wherein the bis-$\beta$-hydroxyethyl terephthalate or its low molecular weight polymer is polycondensed at high temperatures under reduced pressure to form a high molecular weight polyester. Selection of appropriate catalysts is essential to smoothly carry out both reactions in a reasonable time and to obtain a commercially valuable product. In other words, catalysts to be used have a great influence on not only productivity but also qualities of the resultant polymer such as whiteness, transparency, heat resistance, weathering resistance, stability at the time of processing and the like, as is well-known. Therefore, an elaborate consideration should be given to the selection of catalysts.

Referring to the second stage (polycondensation stage) catalysts, there are a number of known catalysts including various metallic and non-metallic compounds, among which, antimony compound and germanium compounds are practically employed in the production of polyesters on the commercial scale.

Antimony compounds have been used primarily because of their improved catalytic effect and low cost, but there is still a problem. That is, polyesters prepared by using conventional antimony compounds such as antimony trioxide are tinged with undesirable gray or greenish gray, which is due to the metallic antimony deposited by the reduction of the catalytic antimony compound during polycondensation, although the polyesters are superior in heat resistance and stability at processing. The color formation is particularly important in the case where polyesters are to be used as textile fibers, films and the like because it leads to a considerable reduction of transparency in the case of films and to a considerable reduction of whiteness in the case of textile fibers resulting in the deterioration of brilliancy in a dyeing process.

Thus, to avoid the problem, several new antimony catalysts have been heretofore proposed, including, for example, such pentavalent compounds as described in Japanese patent publications 10,847/1961 and 6,397/1964; pentavalent organoantimony compounds having the formula $R_3SbO$ or $R_3Sb(OH_2)$, as described in Japanese patent publication 15,999/1968; siloxy-antimony compound having the formula $(R_xR_yR_zSiO_m)_n$—Sb[III], as described in Japanese patent publication 351/1970; and antimony salts of aliphatic monocarboxylic acid having at least 12 carbon atoms, as described in British Pat. 1,168,149.

These antimony compounds, however, while being effective for minimizing or avoiding the color formation or darkening of polyesters, have some disadvantages; the pentavalent antimony compounds readily cause side reactions to form undesirable products such as diethylene glycol, which is vigorous in comparison with trivalent antimony compounds; the pentavalent organoantimony compounds and the siloxy-antimony compounds are too expensive because of organometallic compounds; and the antimony salts of aliphatic monocarboxylic acid having at least 12 carbon atoms exercise a slightly less effect for minimizing the color formation than the pentavalent antimony compound and should be used in great amounts in comparison with trivalent antimony compounds to ensure the reasonable rate of polycondensation. Accordingly, these antimony compounds are also unsatisfactory as catalysts to be used in the manufacture of polyesters.

On the other hand, several germanium compounds have been heretofore proposed as a useful polycondensation catalyst, which compounds include germanium alkoxides as disclosed in Japanese patent publication 12,547/1962 and amorphous germanium oxide as disclosed in Japanese patent publication 13,239/1968.

These germanium compounds, however, while they are effective for improving the productivity to a much higher degree than the case where an equal amount of antimony trioxide is used and further producing polyesters possessing excellent whiteness and transparency, also have some disadvantages. That is, germanium compounds are not only expensive but also have a problem in their catalytic efficiency; as nearly a two-thirds of added amounts of germanium to the polycondensation system is inevitably removed from the system during the polycondensation, it is practically difficult to control the reaction rate and polyester containing a considerable amount of undesirable product, i.e. diethylene glycol, are obtained, which polyester exhibits a lower melting point and more reduced processability.

To sum up, though both antimony and germanium compounds are most generally used as a polycondensation catalyst, both are by no means satisfactory.

Thus, to avoid the above-mentioned and other problems, a process for preparing improved linear polyesters and copolyesters with an increased productivity which are substantially colorless and have excellent whiteness and transparency, by using an inexpensive antimony compound, has now been found.

An object of the present invention is to provide a process for preparing polyesters or copolyesters with raised productivity, which have excellent whiteness and transparency, i.e. in which the darkening or color formation inevitably caused by the sole addition of antimony catalyst is minimized or avoided; and have an extremely reduced content of by-product such as diethylene glycol, which content is nearly equal to that obtained by the sole addition of antimony catalyst.

The process of the invention is one for preparing a linear polyester or copolyester containing less than 1% by weight, based on the weight of the polyesters, of diethylene glycol and less than 20 mole percent of metallic antimony based on the mole number of antimony atom contained in an antimony compound used as a polycondensation catalyst, which comprises condensing glycol terephthalate in the presence of the antimony compound and a germanium compound, both compounds being miscible in the polycondensation system, and phosphoric ester, the antimony compound being present in such an amount that a mole number of antimony atom contained in the antimony compound is no less than 0.035% based on one mole of the recurring unit of the polyester and the germanium compound being present in such an amount that a mole number of germanium atom contained in the germanium compound is no more than 0.02% based on one mole of the recurring unit of the polyesters and that the atomic ratio of the germanium atom to the antimony atom is no more than 0.5.

It is surprising that, by the addition of such a small quantity of germanium compound together with antimony compound not only the color formation or darkening are extremely minimized or avoided, but also the productivity is increased and undesirable side reaction to diethylene glycol is caused only to a slight degree which is nearly equal to that in the case where an antimony compound is used alone.

The above-described effect is enhanced by the incorporation of phosphoric ester as a stabilizer in addition to both metallic compounds into the polycondensation system. On the other hand, trivalent phosphorous compound such as phosphorous ester exercises little or no effect; phosphorous ester, even though it is employed together with small amounts of germanium compound, far less obviate the color formation or darkening caused by antimony catalyst, than phosphoric ester and thus, in order to produce polyesters possessing excellent whiteness, great amounts of germanium compound are needed, whereas the similar whiteness to that by phosphoric ester can hardly be obtained. Such trivalent phosphorous compounds have a strong reducing power and therefore, when they are present in the polycondensation system, reduce the antimony catalyst, which probably leads to some darkening of the resulting polyester. Thus, it should be noted that such trivalent phosphorous compounds as phosphorous ester having a strong reducing power have no desired effect; the obviation of the color formation or darkening in the resulting polyester to be achieved by the addition of a very small amount of germanium compound, is not enhanced, but pentavalent phosphorous compounds having no reducing power such as phosphoric ester to be used in the present invention produce the desired effect.

Phosphoric ester to be used in the present invention includes, for example, those prepared from aliphatic alcohol having 1 to 4 carbon atoms, such as trimethyl phosphate, triethyl phosphate, tributyl phosphate; and aromatic phosphoric ester such as triphenyl phosphate, tricresyl phosphate and the like. Among the above phosphoric esters, the former group is most preferable.

Apparently the particular manner whereby phosphoric ester is added to the polycondensation system is not critical. Phosphoric ester can, for example, be simply incorporated into the system alone or incorporated as a solution prepared by heating the phosphoric ester in glycol such as ethylene glycol, propylene glycol or 1,4-butanediol, particularly in ethylene glycol. The latter manner is particularly preferred. Added amounts of phosphoric ester preferably range from 0.001 to 0.5 mole percent based on one mole of the recurring unit of the resulting polyester.

Antimony compounds to be used as a polymerization catalyst in the present invention are those being miscible in the polycondensation system, which include known antimony catalysts to the art; for example, antimony trioxide; antimony halide such as antimony chloride, antimony bromide and antimony fluoride; antimony sulfide; antimonic acid and metal salt thereof such as Ca antimonate, Mg antimonate, Zn antimonate, Mn antimonate, etc.; antimonous acid and metal salt thereof such as Ca antimonite, Mg antimonite, Zn antimonite, Mn antimonite, etc.; antimony glycoxide such as antimony ethylene glycoxide, antimony propylene glycoxide, antimony butylene glycoxide and the like; antimony phenoxide; antimony alkoxide such as antimony glucoxide, antimony ethoxide, antimony methoxide, antimony propoxide, antimony butoxide and the like; and antimony carboxylate such as antimony acetate, antimony propionate, antimony butyrate, antimony formate, antimony benzoate, antimony toluylate and the like. Typical antimony compounds are antimony trioxide, antimony acetate, antimony ethoxide and antimony glycoxide.

Used amounts of the antimony compound is such, that a mole number of antimony atom contained therein is 0.035% or more based on one mole of the recurring unit of the resulting polyester. When the amount is less than the limit, the darkening of polyester is more reduced because of a small dose, but the productivity of polyester decreases.

Germanium compounds to be used in addition to the antimony compound are those being miscible in the polycondensation system, which include, for example, amorphous or crystal germanium dioxide, a eutectic crystal containing germanium dioxide, germanium alkoxide and its derivatives such as germanium tetraethoxide, germanium ethylene glycolate, germanium carboxylate such as the acetate, germanium tetrahalide such as the tetrachloride and other known germanium compounds.

For optimum results, melt-quenched crystal germanium dioxide, amorphous germanium dioxide, prepared by the hydrolysis of germanium tetrachloride at a pH ranging from 5 to 9, germanium tetraethoxide finely powdered crystal, germanium dioxide having an average particle size of no more than 3μ, an aqueous solution of crystal germanium dioxide, an ethylene glycol solution prepared by replacing the medium of the aqueous germanium solution with ethylene glycol, or by directly dissolving crystal germanium dioxide in ethylene glycol in the presence of alkali metal salt or alkaline earth metal salt, may be used.

With regards to used amounts of germanium compound, a polycondensation rate steeply increases with an increase of the used amount. However, a content of diethylene glycol in the resulting polyester peculiarly varies with the used amount of germanium compound; in the case of the used amount being such that a mole number of germanium atom contained in the compound does not exceed 0.02% based on one mole of the recurring unit of polyester, a content of diethylene glycol does not increase so much as the used amount of germanium compound increases. On the contrary, in the case of a mole number of the germanium atom exceeding 0.02%, a content of diethylene glycol considerably increases with an increase of the used amount.

Next, influences of the used amounts of both antimony and antimony compounds on the darkening of polyester are referred to. The darkening is deeply influenced by the used amount of antimony compound, as mentioned hereinbefore, and it is presumed that the principal causes thereof is to be sought in metallic antimony produced by reduction of the antimony compound. Generally, at least 20% by weight of the antimony compound based on the used amount is subjected to reduction during polycondensation, unless germanium compound is not present.

However, metallic antimony content in polyester, in the case where the polycondensation is carried out in the presence of a small but predetermined amount of germanium compound together with antimony compound in accordance with the present invention, is readily reduced and the darkening of polymer extremely decreases. However, even though germanium compound is used in such a great amount that an atomic ratio of the germanium atom contained therein to the antimony atom contained in antimony compound exceeds 0.5, the darkening of polyester is not so obviated as it is used, but a diethylene glycol content in polyester inevitably increases and the great dose unreasonably raises the cost of production. Therefore, suitable amounts of germanium compound to be used together with antimony compound are such that a mole number of the germanium atom is no more than 0.02% based on one mole of the recurring unit of polyester and that an atomic ratio of the germanium atom to antimony atom contained in antimony compound is no more than 0.5.

Glycol trephthalates, which are to be condensed according to the present invention, may be prepared by the direct esterification of terephthalic acid with glycol or the ester-interchange of a lower dialkyl ester of terephthalic acid with glycol in a usual manner. Suitable glycols to be used for the esterification or the ester-interchange are those having 2 to 16 carbon atoms, which include, for example, ethylene glycol, 1,4-butanediol, cyclohexane-1,4-dimethanol and mixtures thereof. The esterification or ester-interchange of glycols, which is a precursory process of the polycondensation of the present invention, can be performed in normal manner in the presence of various known catalysts.

Glycol terephthalate to be condensed according to the present invention, may be used alone or as an admixture with each other or with minor amounts of copolycondensation components such as phthalic acid, isophthalic acid, adipic acid, succinic acid 4-β-oxyethoxybenzoic acid, 1,4-butanediol, cyclohexane-1,4-dimethanol and the like.

The polycondensation of glycol terephthalate may be carried out under normal conditions except that the predetermined amounts of the three components, i.e. germanium compound, antimony compound and phosphoric ester are employed.

The catalytic antimony and germanium compounds may be used for the polycondensation in normal manner. They may be added to the reaction mixture at any stage from the time before the first stage esterification or ester-interchange commences to the time while the second stage polycondensation is going on, and in any form, i.e. as a solution or a slurry glycol such as ethylene glycol, propylene glycol or 1,4-butanediol in ethylene glycol or a solid form. It is, however, most desirable to add the catalytic compounds in a form of solution or slurry in ethylene glycol to glycol terephthalates, produced by the esterification or ester-interchange, after the esterification or ester-interchange, catalyst is inactivated by the addition of phosphoric ester, but before polycondensation commences.

Apparently, other additives, such as pigment, stabilizer, delustrant and the like, may be added before or during the polycondensation for the particular properties desired in the final product.

The invention will be further illustrated with reference to examples, in which "parts" are "by weight" unless otherwise specified and intrinsic viscosity $[\eta]$ of polymers was determined in a mixture solvent of tetrachloroethane and phenol (1:1) at a temperature of 25° C., and content of diethylene glycol (DEG) was determined by gas chromatography after polymer is hydrolyzed by hydrazine.

Both luminous reflectance, represented by Y value, and excitation purity, represented by PI value, of polymers were determined as follows: The sample polymer was spun and drawn in a normal manner to form filaments having a fineness of 75 d./36 fils. The filament test specimen was illuminated by a substantially unidirectional beam in an automatic recording spectrophotometer (manufactured by Hitachi Seisakusho, Japan; Model EPR-2). Reflectance was measured on the test specimen and the magnesium oxide standard white surface, the latter being used as a standard. An increased Y value means the polymer absorbing less light and an increased PI value means the reflection light being near to white.

EXAMPLE 1

10,000 parts of dimethyl terephthalate and 7,500 parts of ethylene glycol were heated at temperatures of 150° C. to 220° C. under an atmosphere of nitrogen in the presence of 6 parts of magnesium acetate to effect ester-interchange while methanol, thus produced, was continuously distilled off from the reaction mixture. The reaction was completed three hours after its initiation. The reaction product was then distilled by heating to remove an excess of ethylene glycol therefrom.

To the reaction produce, (1) a solution prepared by treating 3.2 parts of trimethyl phosphate in 100 parts of ethylene glycol at a temperature of 175° C. while methanol thus produced, was distilled off therefrom, (2) 3 parts of antimony trioxide and (3) 0.2 part of amorphous germanium dioxide (atomic ratio of Ge/Sb was 0.094) were added at a temperature of 240° C. The mixture was then vacuumed by degrees and finally, polycondensed at a temperature of 285° C. and a pressure of 2 mm. Hg over a period of 2 hours.

The resultant polymer had $[\eta]$ of 0.757 and DEG of 0.67% and was colorless and transparent. Fine filaments, obtained by spinning and drawing thereof, were characterized as having a Y value of 88.3% and a PI value of 98.6% and exhibited excellent whiteness and luster.

EXAMPLE 2

Process of Example 1 were repeated under the same conditions as those described in Example 1 except that added amounts of amorphous germanium dioxide were varied (Exp. No. 2-a~2-e). Results of Examples 1 and 2-a~2-e are shown in Table 1, in comparison with those of Control Example (Exp. No. C-1~C-4) wherein added amounts of either germanium compound or antimony compound were out of the scope of the invention.

TABLE 1

| Example number | Added amounts (wt. percent/polymer) | | Atomic ratio (Ge/Sb) | $[\eta]$ | DEG (wt. percent) | Y value (percent) | PI value (percent) | Color tone of polymer |
|---|---|---|---|---|---|---|---|---|
| | Sb$_2$O$_3$ | Amorphous GeO$_2$ | | | | | | |
| C-1 | 0.03 | | 0 | 0.626 | 0.61 | 80.3 | 98.7 | Grayish white. |
| 2-a | 0.03 | 0.0005 | 0.023 | 0.654 | 0.63 | 84.8 | 99.1 | Slightly grayish white. |
| 2-b | 0.03 | 0.001 | 0.047 | 0.727 | 0.65 | 86.4 | 99.1 | Very slightly grayish white. |
| Ex. 1 | 0.03 | 0.002 | 0.094 | 0.757 | 0.67 | 88.3 | 98.6 | Colorless. |
| 2-c | 0.03 | 0.005 | 0.23 | 0.787 | 0.67 | 88.8 | 98.7 | Do. |
| 2-d | 0.03 | 0.007 | 0.33 | 0.796 | 0.70 | 89.1 | 98.9 | Do. |
| 2-e | 0.03 | 0.01 | 0.47 | 0.801 | 0.94 | 88.9 | 98.9 | Do. |
| C-2 | 0.03 | 0.015 | 0.70 | 0.820 | 1.21 | 88.8 | 98.9 | Do. |
| C-3 | 0.03 | 0.02 | 0.94 | 0.884 | 1.29 | 89.6 | 99.0 | Do. |
| C-4 | | 0.03 | | 0.747 | 1.44 | 90.9 | 99.7 | Do. |

As is apparent from Table 1, the sole addition of antimony trioxide results in polymer possessing a reduced DEG content but a considerable darkening with a grayish white tinge. On the other hand, the sole addition of amorphous germanium dioxide results in the rapid polycondensation rate and polymer possessing excellent whiteness but an increased DEG content, provided that added amounts of the germanium dioxide is equal to those of antimony trioxide. However, in the case where a small amount of amorphous germanium dioxide is used together with antimony trioxide, the following benefits are secured; (1) polycondensation rate greatly increases and (2) the darkening of the polymer extremely decreases with an increase of the used amount of the germanium compound and the lightness of the polymer is as same as that of the polymer obtained by using sole germanium dioxide, and (3) DEG content is reduced; when the atomic ratio of Ge/Sb is less than 0.3, the content is nearly equal to that obtained by the sole addition of antimony trioxide. As is also apparent from Control Examples (C–2 and C–3), when the atomic ratio of Ge/Sb exceeds 0.5, DEG content steeply increases. Thus, it is presumed that both germanium and antimony compounds interact with each other only within a limited stoichiometric range during polycondensation and consequently, apparently exhibit a synergistic effect at the atomic ratio of Ge/Sb being no more than 0.5.

Control Example 5

Using 7 parts of triphenyl phosphite in place of the solution of trimethyl phosphate in ethylene glycol, a process of Example 1 was repeated with all other conditions remaining the same.

The resultant polymer had $[\eta]$ of 0.712 and DEG of 0.69% and was tinged with grayish and considerable dark. Filaments, made therefrom, were characterized as having a Y value of 80.1% and a PI value of 98.4% and tinged with dark.

Control Example 6

Without the addition of amorphous germanium dioxide, a process of Control Example 5 was repeated with all other conditions remaining the same. The resultant polymer had $[\eta]$ of 0.636 and DEG of 0.63% and was tinged with dark gray.

EXAMPLE 3

Using solid triphenyl phosphate in place of a solution of trimethyl phosphate, a process of Example 1 was repeated with all other conditions remaining the same.

The resultant polymer had $[\eta]$ of 0.667 and DEG of 0.64% and was tinged with slight dark. Filaments, made therefrom, were characterized as having a Y value of 83.1% and a PI value of 98.8% and were lustrous but tinged with slight dark.

EXAMPLE 4

10,000 parts of dimethyl terephthalate and 7,500 parts of ethylene glycol were heated at temperatures of 150° C. to 220° C. under an atmosphere of nitrogen in the presence of 6 parts of magnesium acetate to effect ester-interchange while methanol, thus produced, was continuously distilled off from the reaction mixture. The reaction was completed three hours after its initiation. The reaction product was then distilled by heating to remove an excess of ethylene glycol therefrom.

To the reaction product, (1) a solution prepared by treating 3.2 parts of trimethyl phosphate in 100 parts of ethylene glycol at a temperature of 175° C. while methanol, thus produced, was distilled off therefrom, (2) 3 parts of antimony trioxide and (3) 0.5 part of finely powdered crystal germanium dioxide having an average particle size of 2.4μ (atomic ratio of Ge/Sb was 0.23) were added at a temperature of 240° C. The mixture was then vacuumed by degrees and finally, polycondensed at a temperature of 285° C. and a pressure of 2 mm. Hg over a period of 2 hours.

The resultant polymer had $[\eta]$ of 0.770 and DEG of 0.64% and was colorless and transparent. Filaments, made therefrom, were characterized as having a Y value of 88.6% and a PI value of 98.8%; and exhibited excellent whiteness and luster.

EXAMPLE 5

Process of Example 4 was repeated under the same conditions as those described in Example 4 except that added amounts of the finely powdered crystal germanium dioxide having an average particle size of 2.4μ were varied (Exp. No. 5–f~5–j). Results of Examples 4 and 5–f~5–j are shown in Table 2, in comparison with those of Control Examples (C–7~C–10) wherein added amounts of either germanium compound or antimony compound were out of the scope of the invention.

TABLE 2

| Example number | Added amounts (wt. percent/polymer) Sb₂O₃ | Added amounts (wt. percent/polymer) Crystal GeO₂ | Atomic ratio (Ge/Sb) | $[\eta]$ | DEG (wt. percent) | Y value (percent) | PI value (percent) | Color tone of polymer |
|---|---|---|---|---|---|---|---|---|
| C–7 | 0.03 | | 0 | 0.626 | 0.61 | 80.3 | 98.7 | Grayish white. |
| 5–f | 0.03 | 0.0005 | 0.023 | 0.644 | 0.61 | 83.8 | 98.9 | Slightly grayish white. |
| 5–g | 0.03 | 0.001 | 0.047 | 0.722 | 0.67 | 87.1 | 99.0 | Very slightly grayish white. |
| 5–h | 0.03 | 0.002 | 0.094 | 0.746 | 0.67 | 88.4 | 98.6 | Colorless. |
| Ex. 4 | 0.03 | 0.005 | 0.23 | 0.770 | 0.64 | 88.6 | 98.8 | Do. |
| 5–i | 0.03 | 0.007 | 0.33 | 0.788 | 0.77 | 89.2 | 98.9 | Do. |
| 5–j | 0.03 | 0.01 | 0.47 | 0.791 | 0.89 | 89.0 | 98.8 | Do. |
| C–8 | 0.03 | 0.015 | 0.70 | 0.811 | 1.24 | 89.1 | 98.8 | Do. |
| C–9 | 0.03 | 0.02 | 0.94 | 0.836 | 1.31 | 89.6 | 98.6 | Do. |
| C–10 | | 0.03 | | 0.733 | 1.46 | 90.6 | 99.4 | Do. |

As is apparent from Table 2, when a small amount of the powdered crystal germanium dioxide is used together with antimony trioxide, the similar benefits to those described in Example 2 are secured; (1) polycondensation rate greatly increases and (2) the darkening of polymer extremely decreases with an increase of the used amount of germanium dioxide, and (3) in the case of the atomic ratio of Ge/Sb being less than 3, DEG content is nearly equal to that obtained by the sole addition of antimony trioxide.

EXAMPLE 6

10,000 parts of dimethyl terephthalate and 7,500 parts of ethylene glycol were treated in the presence of 6 parts of magnesium acetate in the same manner as that of Example 1 to complete ester-interchange. To the reaction product, the following three solutions were added at a temperature of 240° C.; (1) a solution prepared by treating 3.5 parts of trimethyl phosphate in 100 parts of ethylene glycol at a temperature of 175° C. while methanol, thus produced, was distilled off therefrom, (2) a solution of 3 parts of antimony trioxide in 100 parts of ethylene glycol and (3) a solution prepared as follows; 0.5 part of commercially available crystal germanium dioxide (atomic ratio of Ge/Sb was 0.23) was dispersed in 50 parts of ethylene glycol. 0.43 part of calcium acetate was then added to the dispersion, followed by agitation for 2 hours with the temperature being maintained at a boiling point of ethylene glycol.

The mixture was vacuumed by degrees and finally, polycondensed at a temperature of 285° C. and a pressure of 2 mm. Hg over a period of 2 hours.

The resultant polymer had [η] of 0.767 and DEG of 0.63% and was colorless and transparent. Filaments, made therefrom, were characterized as having a Y value of 89.0% and a PI value of 98.8% and exhibited excellent whiteness and luster.

EXAMPLE 7

10,000 parts of dimethyl terephthalate and 7,500 parts of ethylene glycol were treated in the presence of 6 parts of magnesium acetate in the same manner as that of Example 1 to complete ester-interchange. To the reaction product, the following three solutions were added at a temperature of 240° C.; (1) a solution prepared by treating 4.2 parts of triethyl phosphate in 100 parts of ethylene glycol at a temperature of 175° C. while methanol, thus produced, was distilled off therefrom, (2) a solution of 6.1 parts of antimony acetate in 150 parts of ethylene glycol and (3) a solution of 0.5% germanium dioxide in ethylene glycol, which solution was prepared as follows; 0.6 part of commercially available crystal germanium dioxide (atomic ratio of Ge/Sb was 0.28) was dissolved in 60 parts of water at a temperature of 100° C., followed by addition of 150 parts of ethylene glycol. The resultant solution was distilled by heating to remove the whole amount of water and a small amount of ethylene glycol therefrom.

The mixture was vacuumed by degrees and finally, polycondensed at a temperature of 285° C. and a pressure of 2 mm. Hg over a period of 2 hours.

The resultant polymer had [η] of 0.786 and DEG of 0.69% and was colorless and transparent. Filaments, made therefrom, were characterized as having a Y value of 89.9% and a PI value of 98.9% and exhibited excellent whiteness and luster.

EXAMPLE 8

10,000 parts of dimethyl terephthalate and 7,500 parts of ethylene glycol were treated in the presence of 6 parts of magnesium acetate in the same manner as that of Example 1 to complete ester-interchange. To the reaction product, the following components were added at a temperature of 240° C.; (1) a solution prepared by treating 6.1 parts of triethyl phosphate in 100 parts of ethylene glycol at a temperature of 175° C. while methanol, thus produced, was distilled off therefrom, and (2) a solution prepared by treating 4.0 parts of antimony trioxide and 0.67 part of amorphous germanium dioxide in 100 parts of ethylene glycol (atomic ratio of Ge/Sb was 0.23).

The mixture was vacuumed by degrees and finally, polycondensed at a temperature of 285° C. and a pressure of 2 mm. Hg over a period of 1.5 hours.

The resultant polymer had [η] of 0.768 and DEG of 0.68% and was colorless and transparent. Filaments, made therefrom, were characterized as having a Y value of 88.6% and a PI value of 98.7% and exhibited excellent whiteness and luster.

EXAMPLE 9

10 parts of calcium acetate were added to a mixture of 9,000 parts of dimethyl terephthalate, 1,000 parts of dimethyl isophthalate and 7,500 parts of ethylene glycol at a temperature of 150° C. The mixture was treated for 3 hours with the temperature being raised from 150 to 220° C. to complete ester-interchange. The reaction product was then distilled to remove an excess of ethylene glycol therefrom with the temperature being raised to 240° C.

To the product, (1) a solution prepared by treating 4.6 parts of trimethyl phosphate in 100 parts of ethylene glycol at a temperature of 170° C. while methanol, thus produced, was distilled off therefrom and (2) 7.1 parts of antimony acetate (Sb content of which corresponded to 3 parts of Sb₂O₃) were added at a temperature of 240° C., (3) 0.5 part of amorphous germanium dioxide (atomic ratio of Ge/Sb was 0.23) was further added. The mixture was then vacuumed by degrees with the temperature being raised and finally, polycondensed at a temperature of 285° C. and a pressure of 2 mm. Hg for 2 hours.

The resultant polymer had [η] of 0.766 and DEG of 0.66 and was colorless and transparent. Filaments, made therefrom, were characterized as having a Y value of 88.1% and a PI value of 98.6% and exhibited excellent whiteness and luster.

EXAMPLE 10

A mixture of 1,000 parts of terephthalic acid, 560 parts of ethyl glycol and 0.5 part of calcium acetate was charged into an autoclave equipped with a distillation apparatus, followed by heating while being stirred under an atmosphere of nitrogen. When the pressure reached 3 kg./cm.² with an increase of the temperature, a valve was opened to distill off water. Then, the mixture was treated at a temperature of 230° C. for 3 hours while water, thus produced, was distilled off therefrom.

To the reaction product, (1) a solution prepared by treating 0.25 part of trimethyl phosphate in 10 parts of ethylene glycol at a temperature of 170° C. and (2) 0.7 part of antimony triethoxide (Sb content of which corresponded to 0.4 part of Sb₂O₃) were added. After (3) an aqueous solution of 0.027 part of commercially available germanium dioxide (atomic ratio of Ge/Sb was 0.094) dissolved in 3 parts of water at a temperature of 100° C. was added, the mixture was vacuumed by degrees with the temperature being raised and finally, polycondensed at a temperature of 280° C. and a pressure of 2 mm. Hg over a period of 2 hours.

The resultant polymer had [η] of 0.724 and DEG of 0.96% and was bright and tinged with slight yellow but no darkening.

What we claim is:

1. A process for preparing polyethylene terephthalate or copolymer thereof containing less than 1% by weight, based on the weight of said polyester, of diethylene glycol which comprises condensing ethylene glycol terephthalate in the presence of (1) an antimony compound and (2) a germanium compound, both compounds being miscible in the polycondensation system, and (3) a phosphoric ester, said antimony compound being present in such an amount that mole number of antimony atoms contained in the antimony compound is no less than 0.035% by mole per one mole of the recurring unit of said polyester and said germanium compound being present in such an amount that mole number of germanium atoms contained in said germanium compound is no more than 0.02% based on one mole of the recurring unit of said polyester and that the atomic ratio of germanium atom to antimony atom is from 0.05 to 0.5.

2. A process according to claim 1, wherein said antimony compound is at least one member selected from antimony trioxide, antimony halide, antimony sulfide, antimonic acid and metal salt thereof, antimonous acid and metal salt thereof, antimony glycoxide, antimony phenoxide, antimony alkoxide and antimony carboxylate.

3. A process according to claim 1, wherein said germanium compound is at least one member selected from amorphous or crystal germanium dioxide, germanium tetraalkoxide, germanium tetraglycoxide, germanium tetracarboxylate and germanium tetrahalide.

4. A process according to claim 1, wherein said atomic ratio of said germanium atom to said antimony atom ranges from 0.05 to 0.3.

5. A process according to claim 1, wherein said antimony compound and said germanium compound are antimony trioxide and amorphous germanium dioxide, respectively, and said both compounds are present in 0.03% and 0.005%, respectively, both by weight based on the weight of said polyester.

6. A process according to claim 1, wherein said antimony compound and said germanium compound are added to the polycondensation system as a solution or solutions in glycol before polycondensation of glycol terephthalate commences.

7. A process according to claim 1, wherein said phosphoric ester is the one selected from trimethyl phosphate, triethyl phosphate, tributyl phosphate, triphenyl phosphate and tricresyl phosphate.

8. A process according to claim 1, wherein said phosphoric ester is present in a range from 0.001 to 0.5 mole percent based on one mole of the recurring unit of said polyester.

9. A process according to claim 1, wherein said phosphoric ester is added to the polycondensation system as a solution prepared by treating said phosphoric ester in glycol at elevated temperature.

10. A process according to claim 1, wherein said glycol terephthalate is further condensed together with minor amounts of at least one copolycondensation component selected from phthalic acid, isophthalic acid, adipic acid, succinic acid, 4 - β-oxyethoxybenzoic acid, 1,4-butanediol and 1,4-cyclohexanedimethanol.

References Cited
UNITED STATES PATENTS

| | | | |
|---|---|---|---|
| 3,028,366 | 4/1962 | Engle et al. | 260—75 |
| 3,489,722 | 1/1970 | Kotani et al. | 260—75 |
| 3,546,177 | 12/1970 | Kibler et al. | 260—75 |

FOREIGN PATENTS

| | | |
|---|---|---|
| 34,838 | 11/1970 | Japan. |
| 1,568,479 | 4/1969 | France. |
| 1,562,617 | 4/1969 | France. |

MELVIN GOLDSTEIN, Primary Examiner

U.S. Cl. X.R.

260—47 C

UNITED STATES PATENT OFFICE
CERTIFICATE OF CORRECTION

Patent No. 3,795,639            Dated March 5, 1974

Inventor(s) KAZUYA CHIMURA ET AL

It is certified that error appears in the above-identified patent and that said Letters Patent are hereby corrected as shown below:

In the heading to the patent, Column 1, after "Claims priority,"
      change "application" to --applications--
      and after "45/44,983" add --; 45/44980; 45/44981 and 45/44982--.

Column 1, line 52: "of a low" should read --or a low--.

Column 4, lines 71 and 72: "both antimony and" should be deleted.

Column 6, line 38: "produce" should read --product--.

Signed and sealed this 13th day of August 1974.

(SEAL)
Attest:

McCOY M. GIBSON, JR.        C. MARSHALL DANN
Attesting Officer           Commissioner of Patents